United States Patent [19]

Nguyen

[11] Patent Number: 5,147,503
[45] Date of Patent: Sep. 15, 1992

[54] RECYCLING WASTE CELLULOSIC MATERIAL WITH SODIUM SULPHIDE DIGESTION

[75] Inventor: Xuan T. Nguyen, Montreal, Canada

[73] Assignee: Domtar Inc., Montreal, Canada

[21] Appl. No.: 663,397

[22] Filed: Mar. 1, 1991

[51] Int. Cl.$^5$ .................................................. D21C 5/02
[52] U.S. Cl. ............................................ 162/7; 162/8; 162/30.11
[58] Field of Search ............... 162/7, 8, 5, 30.1, 30.11

[56] References Cited

U.S. PATENT DOCUMENTS

| | | | |
|---|---|---|---|
| 3,425,897 | 2/1969 | Murphy, Jr. | 162/8 |
| 3,440,134 | 4/1969 | Murphy, Jr. | 162/8 |
| 3,884,750 | 5/1975 | Iannazzi | 162/4 |
| 4,385,997 | 5/1983 | Stradal | 162/4 |
| 4,737,238 | 4/1988 | de Ruvo | 162/4 |

FOREIGN PATENT DOCUMENTS

| | | | |
|---|---|---|---|
| 1110411 | 10/1981 | Canada . | |
| 0167475 | 10/1982 | Japan | 162/8 |
| 7408641 | 12/1975 | Netherlands | 162/8 |

Primary Examiner—Karen M. Hastings
Attorney, Agent, or Firm—Bachman & LaPointe

[57] ABSTRACT

Waste cellulosic material, for example corrugated paperboard is cooked in an aqueous alkaline cooking liquor to produce a brownstock pulp having a kappa number lower than that of the waste material; combustion of organic materials in the brownstock washing liquor provides heat energy which can be recovered for use in the cooking process and residual inorganic chemicals of the liquor can be employed to prepare fresh cooking liquor; the recycled pulp can be employed as the sole pulp component of brown paper products, or can be bleached to provide a pulp for white paper products.

13 Claims, 1 Drawing Sheet

RECYCLING WASTE CELLULOSIC MATERIAL WITH SODIUM SULPHIDE DIGESTION

BACKGROUND OF THE INVENTION i) Field of the Invention

This invention relates to a process and apparatus for recycling waste cellulosic material including paperboard to produce a cellulose fiber pulp, and to a cellulose fiber pulp so produced; the invention is especially concerned with recycling waste corrugated paperboard.

ii) Description of Prior Art

Paperboard, including corrugated paper-board, is widely used in packaging; millions of tons of used paperboard are discarded annually, and more than 70% of such discarded waste in Canada goes to landfill sites.

Processes have been proposed to recycle at least a portion of such waste paperboard primarily for use with virgin pulp. Prior processes involve cleaning to remove non-wood contaminants and re-pulping to form a brownstock which is then mixed with virgin pulp for making linerboard or corrugating medium for use in corrugated paperboard.

The quality of the re-pulped fibers is lower than that of comparable virgin pulp fibers and thus it is usual to use the re-pulped fibers only in admixture with higher quality virgin fibers, or to employ chemical additives such as resin or starch to compensate for the inferior quality of the re-pulped fibers. The inferior quality of re-pulped fibers as compared with comparable virgin pulp fibers arises from the processing to which the fibers were subjected during the original paperboard manufacture, and also to aging in the paper product.

In U.S. Pat. No. 4,737,238 recycling of waste paper containing aluminum is described in which an aqueous pulp suspension of the waste paper is screened and then dewatered to produce a white water stream containing most of the aluminum, whereafter the pulp is subjected to oxygen delignification. In Canadian Patent 1,110,411 waste paperboard which contains wax and resin is re-pulped by immersing it in a weak sulphate black liquor at a temperature of 150° to 200° F. to produce defiberization of the waste and separation of wax and resins from the fibers.

Paperboard is itself typically produced from virgin pulp. The production of virgin pulp involves reacting or cooking wood chips with an alkaline cooking liquor at an elevated temperature. The cooking liquor may be a kraft, soda, alkali, sulfite or polysulfide cooking liquor, or a modification thereof, for example an anthraquinone modified cooking liquor. The pulp yield depends on the pulping conditions including reaction time, temperature, liquor type and chemical dosage, and can be as low as 50% to as high as 85%.

Lignin is a component of the woodchips which is dissolved by the cooking liquor in the manufacture of cellulose pulp. The character of the pulp produced is dependent on the extent of lignin removal from the woodchips, and hence on the residual lignin content of the final pulp.

The kappa number represents a measure of residual lignin content. Higher kappa numbers indicate higher residual lignin levels.

The kappa number of a brownstock pulp obtained from cooking softwood in a kraft liquor is typically 50 to 100, and such a pulp is used for making linerboard of corrugated paperboard. The kappa number of a brownstock pulp obtained from cooking hardwood in a kraft liquor is typically 130 to 160, and such a pulp is used for making the corrugated medium of corrugated paperboard.

The kappa number of a hardwood brownstock pulp would need to be reduced to about 10 to 15, and that of a softwood brownstock to about 25 to 35 to provide a pulp suitable for bleaching to produce white paper products.

Corrugated paperboard waste comprising linerboard and corrugating medium has a kappa number of 80 to 120.

Reject pulp from pulping processes and other waste paper products such as old newsprint and used cardboard also represent a similar disposal problem.

SUMMARY OF THE INVENTION

It is an object of the invention to provide a process and apparatus for recycling waste paper and pulp including paperboard, especially corrugated paperboard.

It is a further object of this invention to provide recycled paperboard, especially recycled corrugated paperboard.

It is still a further object of this invention to provide such a process and apparatus in which energy and chemical values are recovered, and, in particular, are recovered and exploited within the process.

It is still a further object of this invention to provide a recycled pulp, and a process and apparatus for its production, from waste paper products and reject pulp, for example paperboard, which recycled pulp has a lower kappa number than that of the waste and which can be employed as the sole pulp in paper product manufacture.

It is yet another object of this invention to provide such a process and apparatus to produce a recycled pulp of low kappa number suitable for bleaching to produce white paper products.

In accordance with the invention, a process for recycling waste cellulosic material, for example paper product or pulp, produces a cellulosic pulp and permits recovery of energy and chemical values which can be exploited in the process.

The process comprises digesting the waste cellulosic material in an aqueous cooking liquor at an elevated temperature to effect delignification and produce a brownstock containing a cellulosic pulp and spent liquor, in which the cellulosic pulp has a kappa number lower than that of the waste paper product or pulp.

The brownstock is washed to produce a brownstock pulp and a brownstock washing liquor, which washing liquor contains inorganic chemicals and combustible organic substances formed during the digesting.

The washed brownstock pulp is recovered for use in paper product manufacture; and at least part of the brownstock washing liquor is concentrated, for example by evaporation, to produce a concentrate. The organic substances in the concentrate are combusted with production of heat energy which is recovered, and inorganic chemical values are produced from the inorganic chemicals which values are also recovered. The recovered heat energy can be used as a source of heat for the cooking liquor to produce the required elevated temperature, and the inorganic chemical values provide a chemical source for use in preparation of the cooking liquor.

In a particular embodiment the cooking liquor comprises a kraft white liquor component containing sodium hydroxide and sodium sulfide and a kraft black liquor component containing organic wood residues and inorganic chemicals; and a portion of the brownstock washing liquor which is derived from the cooking liquor is cycled to form part of the black liquor component. The kraft black liquor component essentially acts as a diluent for the active white liquor component, providing part of the water needs of the white liquor component; at the same time the black liquor component may contain residual or unused chemicals useful in the delignification.

In a particular embodiment the waste cellulosic material is waste paperboard.

The inorganic chemicals in the brownstock washing liquor are, when the cooking liquor comprises kraft liquor, sodium carbonate and sodium sulfate; during combustion of the organic substances in the concentrate of the brownstock washing liquor, the sodium sulfate is reduced to sodium sulfide to form a molten mass of sodium sulfide and sodium carbonate, which can be dissolved in water to form a green liquor which when reacted with quicklime to convert the sodium carbonate to sodium hydroxide with precipitation of calcium carbonate leaves a white liquor of sodium sulfide and sodium hydroxide, which can be cycled to the digesting step as white liquor component.

It is found that the product brownstock pulp of lower kappa number is superior to the re-pulped waste in strength and bonding characteristics in paper product manufacture.

In particular the product brownstock pulp has a kappa number at least 20 below the kappa number of the waste pulp and a significant improvement is obtained in strength characteristics.

Thus the process of the invention provides for recycling of a waste paper product or reject pulp to provide a pulp of superior character as compared with prior recycled pulps from waste, and permits recovery of energy and chemical values which can be exploited in the recycling process.

The invention in another aspect provides the recycled pulp of improved characteristics, produced by the process of the invention.

The invention in yet another aspect provides an installation specially adapted for carrying out the process in preferred embodiments. The installation includes a re-pulper, pulp dewatering means, a digester, a brownstock washer, a furnace, heat recovery means and appropriate connecting lines.

A particular advantage of the process of the invention is that it can be carried out efficiently using old kraft mill equipment which is no longer efficient when used in the manufacture of virgin pulp from wood chips. The shorter treatment time and lesser amount of cooking liquor required in the process of the invention as compared with production of virgin pulp from wood chips enable such old kraft mill equipment to be exploited efficiently and economically. In particular the cooking liquor requirement in the process of the invention is about 55 to 65%, more usually about 60% of the requirement for producing virgin pulp from wood chips; it will be understood that the cooking liquor requirement also depends on the kappa number value required in the pulp product.

The invention is especially suited for recycling paperboard, especially corrugated paperboard having a kappa number of 80 to 120 from which there is produced by the process of the invention a recycled brownstock pulp having a kappa number of 40 to 60, suitable for brown products, or a recycled pulp having a kappa number of 15 to 30, preferably 20 to 25, suitable for bleaching to produce white paper products.

DESCRIPTION OF PREFERRED EMBODIMENTS WITH REFERENCE TO THE DRAWINGS

Figure 1:
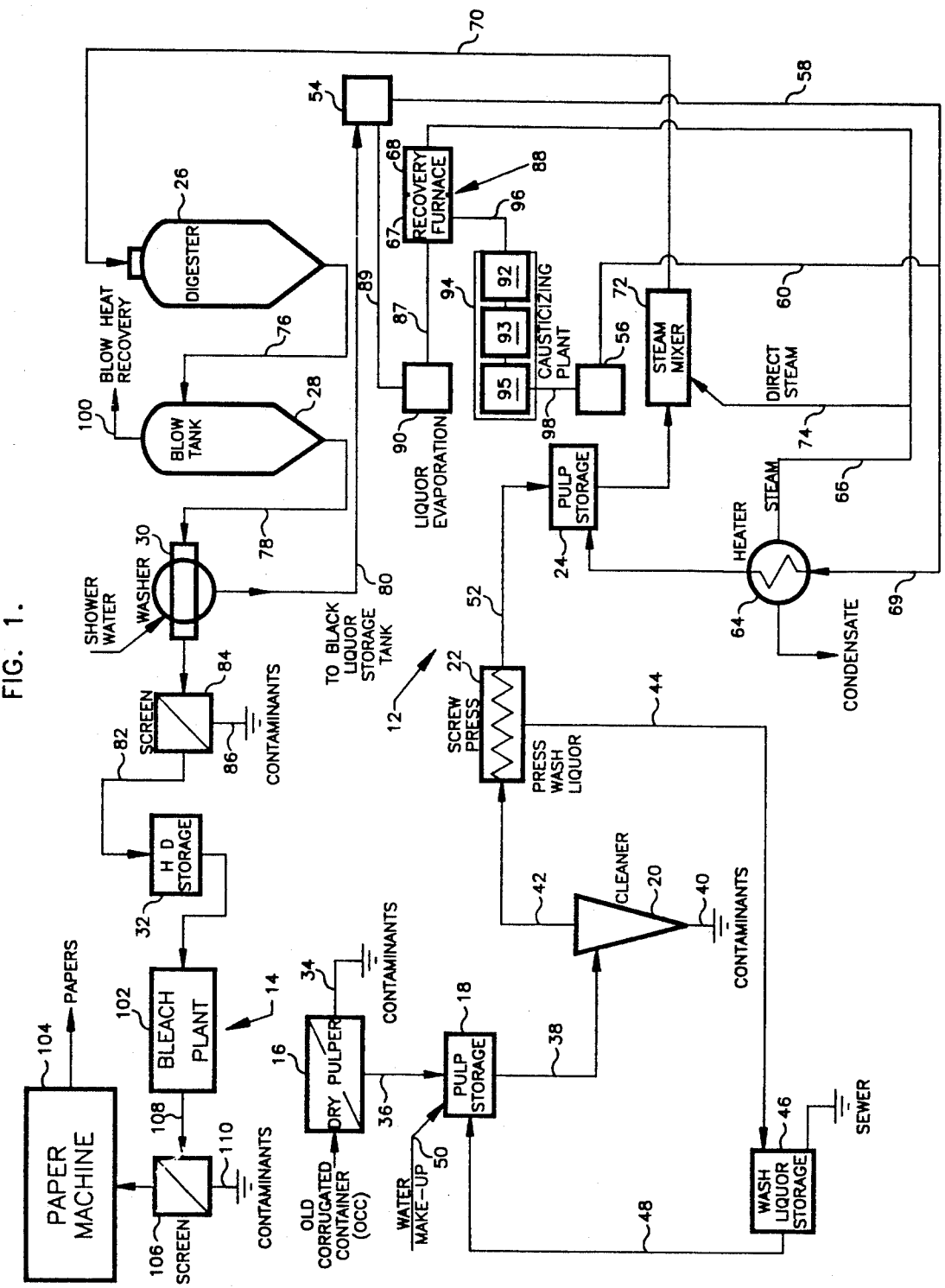
FIG. 1 is a schematic illustration of an installation for producing recycled paper products.

With further reference to FIG. 1, an installation 10 for producing recycled paper products includes a waste paperboard recycling assembly 12 and a paper production assembly 14.

Waste paperboard recycling assembly 12 includes a dry pulper 16, a pulp vessel 18, a cleaning unit 20 and a press 22.

Assembly 12 further includes a pulp vessel 24, a digester 26, a blow tank 28, a brownstock washer 30, a pulp storage vessel 32, a furnace unit 88 having a reaction chamber 67 and a boiler 68 and a reactor unit 94.

A line 34 from dry pulper 16 removes contaminants separated from the paperboard during the so-called dry pulping; and a line 36 connects dry pulper 16 with pulp vessel 18 for flow of the pulp.

A line 38 connects pulp vessel 18 and cleaning unit 20. Cleaning unit 20 has a line 40 for removal of contaminants.

A line 42 connects cleaning unit 20 and press 22 and a line 44 connects press 22 with a wash liquor storage vessel 46. A line 48 connects storage vessel 46 and pulp vessel 18. Pulp vessel 18 has a water make-up line 50.

A line 52 connects press 22 and pulp vessel 24.

A black liquor storage tank 54 has an outlet line 58 and a white liquor tank 56 has an outlet line 60. Lines 58 and 60 meet in common line 69 for delivering black liquor and white liquor into pulp vessel 24.

A heater 64 is disposed in common line 69 having a steam line 66 connected to boiler 68 or furnace unit.

A line 70 communicates pulp vessel 24 with digester 26. A steam mixer 72 is disposed in line 70 and steam mixer 72 has a steam inlet line 74 connected to steam line 66 from boiler 68.

A line 76 communicates the digester 26 with blow tank 28; and a line 78 communicates the blow tank 28 with brownstock washer 30.

A black liquor line 80 communicates the brownstock washer 30 with black liquor tank 54.

A line 82 communicates brownstock washer 30 with pulp storage vessel 32. Screen 84 is disposed in line 82 and has an outlet line 86 for contaminants.

Black liquor tank 54 is connected by line 89 to concentrator 90, and a concentrate line 87 connects concentrator 90 to the reaction chamber 67 of furnace unir 88. Reactor unit 94 for producing white liquor has a green liquor tank 92, a first reactor 93 and a second reactor 95. A line 96 connects reaction chamber 67 of furnace unit 88 with green liquor tank 92. A white liquor line 98 communicates second reactor 95 of reactor unit 94 with white liquor tank 56.

A blow heat recovery line 100 extends from blow tank 28 and may optionally provide heat to boiler 68.

Paper production assembly 14 includes a bleach plant 102 and a paper machine 104. A screen 106 is disposed in a line 108 between bleach plant 102 and paper machine 104; and line 110 provides for removal of contaminants separated in screen 106.

It will be understood that bleach plant 102 is optional and the cellulosic pulp in vessel 32 can be employed directly in paper product manufacture in machine 104.

The recycling operation illustrated in FIG. 1 is now more particularly described by reference to the recycling of waste corrugated paperboard, which paperboard particularly comprises a pair of opposed linerboards with a corrugated medium sandwiched therebetween. Such paperboard may be soiled as a result of use and additionally may have ink printing thereon, as well as polymer surface coatings on the linerboard, adhesive between the corrugated medium and the liners, metal and plastic attachments and paper and plastic tape. The waste corrugated paperboard is fed to dry pulper 16 which breaks the paperboard down to a pulp of fibers and separates the fibers from non-fiber contaminants, for example, metal components and plastic tape. Although referred to as "dry pulping", water is used whereby an aqueous fibre pulp having a solids content, by weight, of 20 to 30% is produced in pulper 16. Separated non-fiber components, become dislodged from the paperboard in pulper 16 and are removed through line 34.

The pulped waste is fed through line 36 to pulp vessel 18 and water is introduced through line 50 to produce an aqueous pulp mix having a solids content typically of 3 to 4%, by weight. Suitably the mix is gently stirred in vessel 18 to separate further non-wood contaminants from the paperboard. The aqueous pulp mix is fed from vessel 18 along line 38 to cleaning unit 20 which may typically include a screen unit and a separate centrifuge vessel. Fine contaminants are removed from the pulp mix through the openings of the screen unit whereafter the pulp mix is delivered to the centrifuge vessel where layer contaminants are removed as the dense fraction developed in the centrifuge vessel. The contaminants are removed through line 40. The aqueous mix is transported from cleaning vessel 20 to press 22 through line 42. Press 22 may, for example, be a screw press in which the aqueous mix is dewatered, under a pressing action. The water pressed from the pulp mix in press 22 flows along line 44 to waste liquor storage vessel 46 from which water may be cycled through line 48 to meet the water requirement in pulp vessel 18. Make-up water is fed to vessel 18 through line 50. Contaminants settling in storage vessel 46 may be removed through a sewer line.

The wet, pressed pulp product in press 22 is delivered through line 52 to pulp vessel 24 and a mix of black liquor and white liquor is fed through line 62 into vessel 24 to provide a wet pulp product having a solids content typically of 30 to 40%, more especially about 35% by weight.

The black liquor from black liquor tank 54 is fed to line 69 along line 58 and the white liquor in line 69 is fed along line 60 from white liquor tank 56. The liquor in line 69 is heated to an elevated temperature, typically 80° to 90° C. The heat in heater 64 is provided by steam line 66 from boiler 68.

The liquor in line 62 serves to transport the pulp from vessel 24 into line 70 and reduces the solids content to about 10 to 25%, by weight.

The aqueous pulp mix in vessel 24 is transported through line 70 to digester 26 by the liquor from line 62. The mix in line 70 passes through the steam mixer 72 in which the temperature is raised to a temperature of about 160° to 180° C. The steam for steam mixer 72 is fed from boiler 68 through steam inlet line 74. The direct introduction of steam into the hot aqueous pulp in steam mixer 72 may reduce the solids content of the pulp mix and the pulp mix arriving in digester 26 has a solids content typically of 12 to 18, usually about 15% by weight. The pulp is cooked in the cooking liquor in digester 26 at an elevated temperature of 160° to 180° C. for a period typically about 30 to 50 minutes, under a saturated steam pressure which typically may be 115 psi. The cooking in digester 26 delignifies the pulp to produce a hot brownstock which comprises the brownstock pulp and spent liquor which contains dissolved organic substances from the pulp and inorganic salt materials from the cooking liquor.

The brownstock is fed from digester 26 to blow tank 28, where the steam pressure is released and from which heat is recovered in a hot exhaust from line 100. The brownstock is fed along line 78 from blow tank 28 to brownstock washer 30 where it is washed to produce a brownstock pulp and a brownstock wash liquor. The brownstock wash liquor is fed from brownstock washer 30 along line 80 to black liquor tank 54 and the brownstock pulp is fed along line 82 to pulp storage vessel 32. The brownstock pulp in line 82 is screened in screen 84 and the contaminants are removed through outlet lines 86.

A major portion of the black liquor in black liquor tank 54 is fed along line 89 to concentrator 90. Black liquor is concentrated in concentrator 90 by evaporation of water typically to a concentration of 55% to 75%, preferably about 65%, and the resulting concentrate is fed along line 87 to the reaction chamber 67 of furnace unit 88. Organic substances in the concentrate are combusted in furnace 88 and the hot exhaust gases generated in the combustion heat the water in the integral boiler 68. The concentrate particularly contains sodium sulfate and sodium carbonate which forms a molten mass in reaction chamber 67. The sodium sulfate is reduced to sodium sulfide to leave a molten mass of sodium sulfide and sodium carbonate in reaction chamber 67. The molten mass is delivered from chamber 67 through line 96 to tank 92 where it is dissolved in water to produce a green liquor. The green liquor is fed to first reactor 93 where quicklime, calcium oxide is reacted with the sodium carbonate to produce sodium hydroxide in a lime mud containing the sodium sulfide and sodium hydroxide, as well as calcium carbonate. The lime mud is fed to reactor 95 where the calcium carbonate is thermally decomposed to generate calcium oxide which can be recycled to reactor 93. In this way a white liquor is produced in reactor 95 and fed from reactor unit 94 along white liquor line 94 to white liquor tank 56.

Thus the inorganic chemicals produced in reaction chamber 67 of furnace 88 are employed as chemical values to generate the white liquor used as cooking liquor in digester 26, and the heat energy developed in furnace 88 is used to generate steam in boiler 68 for heater 64 and steam mixer 72.

The brownstock pulp in vessel 32 can be used as is to produce paperboard products in machine 104 or can first be bleached in bleach plant 102 to remove the lignin and increase the brightness depending on the desired paper product.

EXAMPLES

The following Examples serve to illustrate particular aspects of the invention; in these Examples yields and charges are indicated in weight %.

EXAMPLE 1

Commercial corrugated waste in the form of 2"×8" strips was cooked with an alkaline solution containing 2.9 g/l sodium hydroxide and 2.35 g/l sodium sulphide. The liquor sulphidity, i.e. ratio of sodium sulphide over sodium hydroxide plus half sodium sulphide, was 35%. With a liquor to waste ratio of 10 to 1, the effective alkali charge, i.e. weight of sodium hydroxide plus half sodium sulphide over weight of waste material, was 8%. After cooking at a temperature of 174° C. for about 30 minutes, corresponding to an H-factor of 500, a pulp yield on waste of 76.6% was obtained. The pulp product had a kappa number of 45.5, viscosity of 21.4 and #8 brightness of 25.6.

EXAMPLE 2

As in Example 1, but the cooking of waste was carried out for about 1 hour, corresponding to an H-factor of 1500. The pulp yield on waste in this case was 72.1% and the pulp product had a kappa number of 29.9, a viscosity of 14.9 and a brightness of 29.3.

EXAMPLE 3

Corrugated waste as in Examples 1 and 2 was cooked with an alkaline liquor with a sulphidity of 17.2%. The cooking was carried out at 174° C., a liquor to waste ratio of 9 to 1, an effective alkalis charge of 8% and an anthraquinone charge of 0.04%. After about 30 minutes, corresponding to an H-factor of 500, the pulp yield on waste was 72.8% and the pulp product had a kappa number of 39.5, a viscosity of 18.9 and brightness of 26.0.

EXAMPLE 4

As in Example 3, but the cooking of waste was carried out for about 1 hour, corresponding to an H-factor of 1500. The pulp yield on waste in this case was 70.2% and the pulp product had a kappa number of 26.7, a viscosity of 13.8 and a brightness of 29.0.

EXAMPLE 5

A commercial corrugated waste was re-pulped and cleaned to remove all contaminants from waste. The resultant waste had a kappa number of 91.5, a viscosity of 32.8 and a brightness of 14.8. This waste was then cooked for about 30 minutes, corresponding to an H-factor of 500, with an alkaline liquor having a sulphidity of 35%, at a temperature of 174° C., with a liquor to waste ratio of 7 to 1 and an effective alkalis charge of 6%. The cooking produced a yield on waste of 81.2%, a pulp having a kappa number of 52.8, a viscosity of 24.2 and a brightness of 18.4.

EXAMPLE 6

As in Example 5, but the cooking of waste was carried out with an effective alkalis charge of and for about 1 hour, corresponding to an H-factor of 1500. The pulp yield on waste in this case was 74.8% and the pulp product had a kappa number of 28.5, a viscosity of 13.7 and a brightness of 21.7.

EXAMPLE 7

Cleaned corrugated waste as in Examples 5 and 6 was cooked with an alkaline liquor having a sulphidity of 25%, at a temperature of 174° C. with a liquor to waste ratio of 7 to 1 and an effective alkalis charge of 10% for about 1 hour, corresponding to an H-factor of 1400. The cooking produced a yield on waste of 74.1%, and a pulp having a kappa number of 26.6, a viscosity of 12.3 and a brightness of 22.5.

EXAMPLE 8

A commercial corrugated waste was re-pulped and cleaned to remove all contaminants from waste. The resultant waste had a kappa number of 84.5, a viscosity of 23.4 and a brightness of 18.6. This was then cooked with an alkaline liquor having a sulphidity of 25%, at a temperature of 174° C. With a liquor to waste ratio of 7 to 1, an effective alkalis charge of 10% for about 45 minutes, corresponding to an H-factor of 1000, the cooking produced a yield on waste of 73.9% and the pulp had a kappa number of 27.2, a viscosity of 12.6 and a brightness of 26.9.

EXAMPLE 9

As in Example 7, but the cooking of waste was carried out with an effective alkalis charge of 12%. The pulp yield on waste in this case was 71.5% and the pulp product had a kappa of 22.0, a viscosity of 11 and a brightness of 28.9.

EXAMPLE 10

Pulp at 3% consistency, produced from Example 7, was bleached in three stages namely D/CEoD. The bleaching chemicals for the first stage was a mixture of chlorine (C) and chlorine dioxide (D) and the pulp bleaching was carried out at 50° C. for 45 minutes. The combined chemical charge was equivalent to a total active chlorine (TAC) of 5.32% at 50% chlorine/chlorine dioxide substitution. The bleached pulp was then extracted at 10% consistency, with 4% caustic (E), at 70° C. and in the presence of oxygen (o) at 45 psig pressure. The kappa, viscosity and brightness of the bleached and extracted pulp (D/CEo) was 2.3, 10.9 and 53.8 respectively. The subsequent bleaching of the D/CEo pulp with 0.5% chlorine dioxide at 70° C., for 150 minutes produced a D/CEoD pulp having a brightness of 81.9 and a viscosity of 10.7.

EXAMPLE 11

Pulp as produced from Example 7 was bleached in three stages D/CEoD as in Example 10, but with a chlorine dioxide dosage of 1.0% in the third stage. The D/CEoD bleached pulp had a brightness of 84.2 and a viscosity of 9.8.

EXAMPLE 12

Pulp as produced from Example 4 was bleached in five stages namely D/CEoDED. The total active chlorine TCA was 5.34% and ClO$_2$ substitution was 50%. The ClO$_2$ dosage in the D1 stage was 0.7%. The D/CEoD pulp had a brightness of 85.6 and a viscosity of 12.1. The D/CeoD pulp was then extracted with 0.4% caustic at 10% consistency and at a temperature of 75° C. for 30 minutes. The resultant D/CEoDE pulp was then bleached with 0.3% ClO$_2$ in the S2 stage at 10% consistency and at a temperature of 75° C. for 60 minutes. The final D/CEoDED pulp had a viscosity of 11.6 and a brightness of 87.9.

COMPARISON EXAMPLE 13

Cleaned commercial waste as in Example 5 was oxygen delignified with 100 psig oxygen gas, at 110 degrees C. for about 30 minutes in the presence of 8% NaOH and 1% MgSO4. The pulp product had a kappa of 49 and a viscosity of 14.2. Compared with the pulp product produced in Example 5 which had a kappa of 52.8 and a viscosity of 24.2, the quality, i.e., viscosity of the oxygen delignified pulp product was clearly inferior.

COMPARISON EXAMPLE 14

Oxygen delignification similar to that of Example 13 was carried out, but the delignification time was about 50 minutes and the NaOH dosage was 12% NaOH. The pulp product had a kappa of 30.5 and a viscosity of 8.0. This product was clearly inferior to the pulp product of Example 6, which had 28.5 kappa and 13.7 viscosity.

COMPARISON EXAMPLE 15

A commercial waste having 85.6 kappa was reslushed and the resultant pulp was used to produce standard handsheets at 127 g/m$^2$ basis weight. The pulp had a freeness of 570 SCF and the corresponding physical properties of the handsheets were a burst factor of 20.6, a ring crush of 32.6 lbs, an H&D stiffness of 42.8 lbs, and a concora of 28.4 lbs.

When this waste was cooked according to Example 5, the pulp product had a kappa of 50 and its freeness remained constant at 570 CSF. The 127 g/m$^2$ handsheets, made with this pulp product had a burst factor of 31.9, a ring crush of 45.6 lbs, an H&D stiffness of 64.6 lbs and a concora of 46.2 lbs.

It is clear from this Comparison Example that when comparing papers made with the reslushed commercial waste and papers made with the same waste treated according to Example 5, the papers of Example 5 are found to be much stronger and most strength properties were increased by at least 50%.

EXAMPLE 16

The black liquor produced from Example 7 was dried overnight at 100 degrees C., to obtain a solid. Through analytical methods, this solid byproduct was found to have a high heating value of about 6000 BTU/lbs.

I claim:
1. A process for recycling waste cellulosic paper product to produce a cellulosic fiber pulp comprising: digesting a waste manufactured paper product having a kappa number of at least 80 in an aqueous alkaline cooking liquor containing at least sodium sulphide at a temperature of 160° C. to 180° C. to effect a delignification of cellulosic fibers in said waste product and produce a brownstock of a cellulosic fiber pulp and spent liquor, said cellulosic fiber pulp having a kappa number up to 40, a viscosity of at least 11 cps, and comprising fibers of a quality such that the pulp can be employed as the sole pulp in paper product manufacture.

2. A process according to claim 1 wherein said delignification is carried out under an atmosphere of saturated steam.

3. A process of claim 1, wherein said waste paper product comprises a single waste paper product having said kappa number of at least 80.

4. A process of claim 1, wherein said waste paper product comprises a mixture of waste paper products.

5. A process of claim 1 wherein said waste paper product is waste paperboard.

6. A process of claim 5 wherein said waste paperboard has a kappa number of 80 to 120.

7. A process of claim 6 in which said paperboard is corrugated paperboard.

8. A process of claim 5 wherein said waste paperboard has a kappa number of 80 to 120 and said digesting is carried out to provide a brownstock pulp having a kappa number of 20 to 25.

9. A process of claim 8 in which said paperboard is corrugated paperboard.

10. A process of claim 8, wherein said aqueous alkaline cooking liquor comprises a kraft white liquor.

11. A process of claim 10 including a step of subjecting said brownstock pulp to a chemical bleaching operation to product a bleached delignified pulp for bleached paper products.

12. A process of claim 1, wherein said aqueous alkaline cooking liquor comprises a kraft white liquor.

13. A process of claim 1 wherein said cooking liquor is employed in an amount relative to the waste paper product, of about 55 to 65%, of the cooking liquor for producing an equivalent amount of virgin pulp from wood chips.

* * * * *

UNITED STATES PATENT AND TRADEMARK OFFICE
CERTIFICATE OF CORRECTION

PATENT NO. : 5,147,503
DATED : September 15, 1992
INVENTOR(S) : Xuan T. Nguyen

It is certified that error appears in the above-identified patent and that said Letters Patent is hereby corrected as shown below:

At column 4, line 58, delete "unir" and insert therefor ... unit ... .

At column 7, line 64, after "alkalis charge of" insert ... 8% ... .

At column 8, line 64, delete "D/CeoD" and insert therefor ... D/CEoD ... .

At column 8, line 67, delete "S2" and insert therefor ... D2 ... .

At column 10, line 6, delete "at least".

Signed and Sealed this

Nineteenth Day of July, 1994

BRUCE LEHMAN

Attest:

Attesting Officer

Commissioner of Patents and Trademarks